(12) United States Patent
Chen

(10) Patent No.: US 6,487,006 B1
(45) Date of Patent: Nov. 26, 2002

(54) SIMULTANEOUS SINGLE MODE AND MULTI-MODE PROPAGATION OF SIGNALS IN A DOUBLE CLAD OPTICAL FIBER

(75) Inventor: Vihong Chen, Freehold, NJ (US)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/570,446

(22) Filed: May 12, 2000

(51) Int. Cl.[7] .................................................. H01S 3/00
(52) U.S. Cl. .............................. 359/341.32; 359/337.1
(58) Field of Search ................................. 385/123, 126; 372/70; 359/337, 341.1, 341.3

(56) References Cited

U.S. PATENT DOCUMENTS

| | | | |
|---|---|---|---|
| 3,808,549 A | * 4/1974 | Maurer | 331/94.5 |
| 5,263,036 A | * 11/1993 | DeBernardi et al. | 372/6 |
| 5,861,973 A | * 1/1999 | Inagaki et al. | 359/341 |
| 5,933,271 A | * 8/1999 | Waarts et al. | 359/341 |
| 5,937,134 A | * 8/1999 | DiGiovanni | 385/142 |
| 6,104,733 A | * 8/2000 | Espindola et al. | 372/6 |
| 6,181,466 B1 | * 1/2001 | Franzoso et al. | 359/341 |

FOREIGN PATENT DOCUMENTS

| | | | |
|---|---|---|---|
| WO | WO 98/52305 | * 11/1998 | H04B/10/17 |

OTHER PUBLICATIONS

Goldberg et al., "High–power superfluorescent source wiht a side–pumped YB–doped double–cladding fiber", Optics letters, vol. 23, No. 13. Jul. 1, 1998, pp. 1037–1039.*
Becker et al., Erbium–Doped Fiber Amplifiers Fundamentals and Technology, Academic Press, 1999, p. 27.*

\* cited by examiner

*Primary Examiner*—Thomas H. Tarcza
*Assistant Examiner*—Deandra H. Hughes
(74) *Attorney, Agent, or Firm*—Lacasse & Associates, LLC

(57) ABSTRACT

An optical amplifier having a suitable length of Er/Yb co-doped double clad optical fiber is used to amplify an input optical signal. The inner clad of the double clad optical fiber supports the propagation of a multi mode signal used to excite Er/Yb co-dopants in the double clad optical fiber. Simultaneously, a single mode signal launched from a single mode laser pump co-propagates with the input optical signal in the core of the optical fiber. In this model, single mode light travels in the single mode core region and the multi mode pump light is mainly in the clad region. The interaction between the two laser pumps is negligible.

15 Claims, 2 Drawing Sheets

SIMULTANEOUS SINGLE MODE AND MULTI-MODE PROPAGATION OF SIGNALS IN A DOUBLE CLAD OPTICAL FIBER

FIELD OF THE INVENTION

This invention relates generally to the field of optical amplifiers and more particularly to a double clad amplifying optical fibre.

BACKGROUND OF THE INVENTION

An optical amplifier is a device that increases the amplitude of an input optical signal that is launched into the optical amplifying fibre together with pump light. When the optical signal at the input to the amplifier is monochromatic, the output signal is also monochromatic with the same frequency.

Conventional optical fibre amplifiers comprise a gain medium such as a single mode-glass optical fibre having a core doped with an active material or dopant excited by pumping the optical fibre with optical energy at predetermined wavelengths within an absorption band of the optical fibre dopant. Typically, the dopant is a rare earth such as erbium (Er) and or ytterbium (Yb).

In prior art double clad optical fibre amplifying systems, the single mode optical fibre has an inner cladding adjacent to the core, and an outer cladding adjacent to the inner cladding. Pump light is launched into the inner cladding of the optical fibre while the signal to be amplified is launched into the core.

As is well known in the art, the pump energy produces a population inversion in the dopant, and the input signal is amplified by stimulated emission to produce an amplified output signal, which is emitted from the other opposite end of the optical fibre. Such optical fibre amplifiers can be unidirectionally pumped with pump sources at one end or bi-directionally pumped with pump sources provided at opposite ends of the optical fibre, one co-propagating with the signal and the other counter-propagating with the signal. The employment of bi-directional pumps provides for higher power output and more power conversion efficiency in the optical fibre. Since U.S. Pat. No. 5,140,456 to Huber, it is well known that a co-propagating pumping configuration provides for lowest noise figure performance for erbium doped fibre amplifier (EDFA), and counter-propagating pumping provides for highest power conversion efficiency.

The optical fibre of the co-propagating fibre amplifier is preferably doped with erbium ($Er^{3+}$). This provides an amplifier which functions well for boosting the energy of a signal having a wavelength of approximately 1550 nm using pumping energy in the wavelength range of 980 nm and/or 1480 nm.

Also known in the art, are optical isolators that are used throughout the amplifier to ensure unidirectional propagation of the optical signal at certain points in the signal path. For example, the optical input signal is passed through an optical isolator at the amplifier input and, again at the amplifier output to minimize amplified spontaneous emission (ASE) and noise coming from optical component reflections or from an optical device to which the amplifier output is coupled.

Also, of concern is the noise figure of the amplifier, which is generally defined as the ratio of the input signal to noise ratio to the amplifier output signal to noise ratio. In order to decrease the noise figure of an amplifier, the amplifier is typically pumped with pump energy that propagates in the same direction as the input signal propagation direction.

It is generally known that Er/Yb co-doped double clad fibre amplifier gives high power output. However, due to the presence of a double cladding and Yb dopant, the population inversion is lower than in the case of single mode laser pumped Er doped single mode optical fibre especially in the case of counter-propagating pumping. For this reason, noise figure is high and usually, a single mode pre-amplifying stage is provided to improve noise figure.

Amplifier pump sources are often in the form of laser diodes available as single mode or multi-mode diodes. Single mode laser diodes are effectively point sources, diffraction limited in their divergence in both axes. Multi-mode diodes typically have laser junctions in the form of short bundles, ranging between 10 to 200 microns long. Diffraction of multi-mode diodes is limited in the direction perpendicular to the junction, but they have non-diffraction limited divergence in the direction parallel to the laser junction. The emitting aperture of a multi-mode diode can be a single continuous stripe, a collection of short stripes or even a collection of single mode emitters electrically connected in parallel. The single mode pump laser referred to is a single stripe diode laser that has a single mode fiber pigtail. The multimode laser is a multi-stripe diode laser that has a multimode fiber pigtail. The core size of the multimode fiber is equal or close to the size of the first cladding of the double clad fiber mentioned above.

It is an object of this invention to provide an optical pumping scheme that will provide significant amplification of an optical signal with low noise figure at a relatively reasonable cost.

SUMMARY OF THE INVENTION

In accordance with the invention there is provided an optical amplifier for amplifying an input optical signal comprising a wave-guide having a core doped with a rare earth and an adjacent first cladding; a first laser pump coupled to the core; and, a second laser pump coupled to the first adjacent cladding.

In accordance with the instant invention, the first pump is a single mode laser pump and the second pump is a multi-mode laser pump; and the two pumps launch simultaneous optical signals into the core and into the first adjacent cladding.

In accordance with this invention, the simultaneous coupling of the single mode laser pump and the multi-mode laser pump allows counter propagation of the two launched pump signals.

In accordance with this invention, there is furnished a method of amplifying an optical signal comprising the steps of providing a double clad optical fibre having an inner cladding and having a core doped with a rare earth; and launching the optical signal into the core of the optical fibre while simultaneously launching a pump signal into the inner cladding and another pump signal into the core.

BRIEF DESCRIPTION OF THE DRAWINGS

Exemplary embodiments of the invention will now be described in conjunction with the drawings in which.

DETAILED DESCRIPTION

Figure 1:
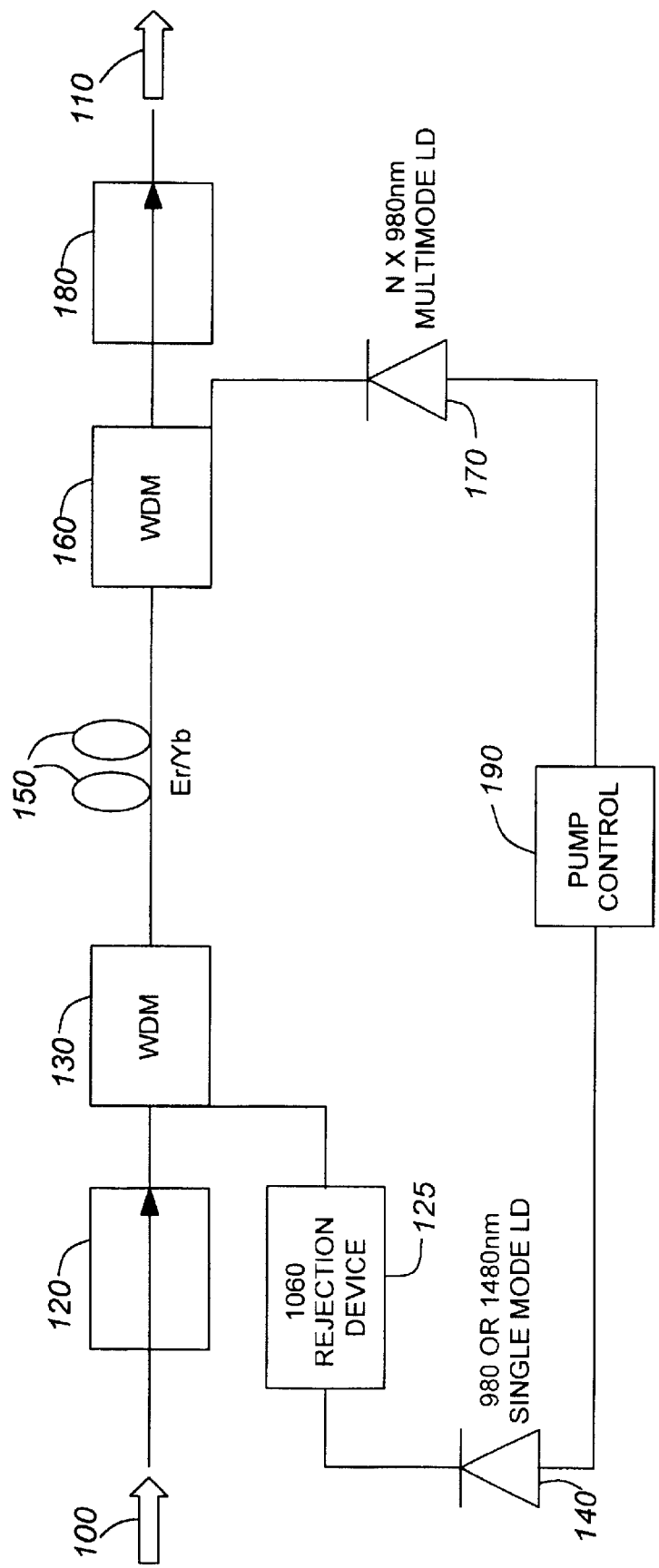
FIG. 1 is a block diagram showing the simultaneous counter-propagation of a single mode pump laser into the core of a single mode optical fibre and a multi-mode pump laser in the double clad area of a double clad optical fibre while a ASE rejection device is incorporated to improve the quality of the signal according to an embodiment of the invention.

Referring now to FIG. 1 an optical amplifying system is shown having a first single-clad, single-mode optical fibre at an input end 100 for launching a communications signal to be amplified and having a second single clad, single mode optical fibre at an output end 110 from which the amplified communications signal propagates. A suitable length of single mode, double clad Er/Yb fibre 150 is disposed centrally within the amplifier and is optically coupled to the input 100 and output 110 single mode ends. Between the double clad fibre 150 and the input end 100 is a first optical isolator 120 followed by a WDM 130 which passes a 980 nm or 1480 nm pump signal coupled with the WDM 130 and which passes the communications signal received from the isolator 120. A 1060 nm rejection device in the form of a filter 125 is disposed between the WDM 130 and a single mode pump 140, which allows the 980 nm or 1480 nm pump signal to reach the core of the double clad fibre 150 and which prevents 1060 nm light from damaging the pump 140. Between the output end 110 and the double clad fibre 150 is a laser junction in the form of a multimode pump coupler 160, which passes a multi-mode signal from a multi-mode laser pump 170 and which passes the amplified communication signal through a second optical isolator 180. A control means in the form of a pump control 190 is coupled to the single mode laser pump 140 and the multi-mode laser pump 170 to provide simultaneous launching from the two pumps. The activation of the pump control 190 depends on detectors (not shown) installed on one end or the other or both ends of the amplifier.

In operation, a single mode communication signal to be amplified is launched from the input end 100 into the core of the first single mode, single clad optical fibre optically coupled to the single mode, double clad optical fibre 150. As the communication signal propagates through the core of the double clad fibre 150, the 980 nm or 1480 nm single mode pump signal from the single mode laser pump 140 is launched into the core of the double clad fibre 150 to co-propagate with the communication signal. Simultaneously, the multi-mode pump signal from the multi-mode laser pump 170, which is typically in the range of 920 nm–980 nm, is launched into the inner cladding layer of the double clad optical fibre 150 to counter-propagate with the two previous signals. The energy released from the excitation of Er/Yb is transferred to the communication signal for amplification of same. Unwanted amplified spontaneous emission (ASE) is removed with 1060 nm rejection device or filter 125, which blocks back-traveling 1060 nm ASE in order to avoid instability and damage it could cause to the single mode laser pump 140.

Depending on the type of the WDM 130 and the 1060 nm rejection device 125, the rejection device 125 could also be in the place between WDM 130 and Er/Yb fiber 150

Although this embodiment illustrates counter-propagation of the single mode and multi mode pump signals, simultaneous co-propagation in the same direction is also within the scope of the instant invention.

Figure 2:
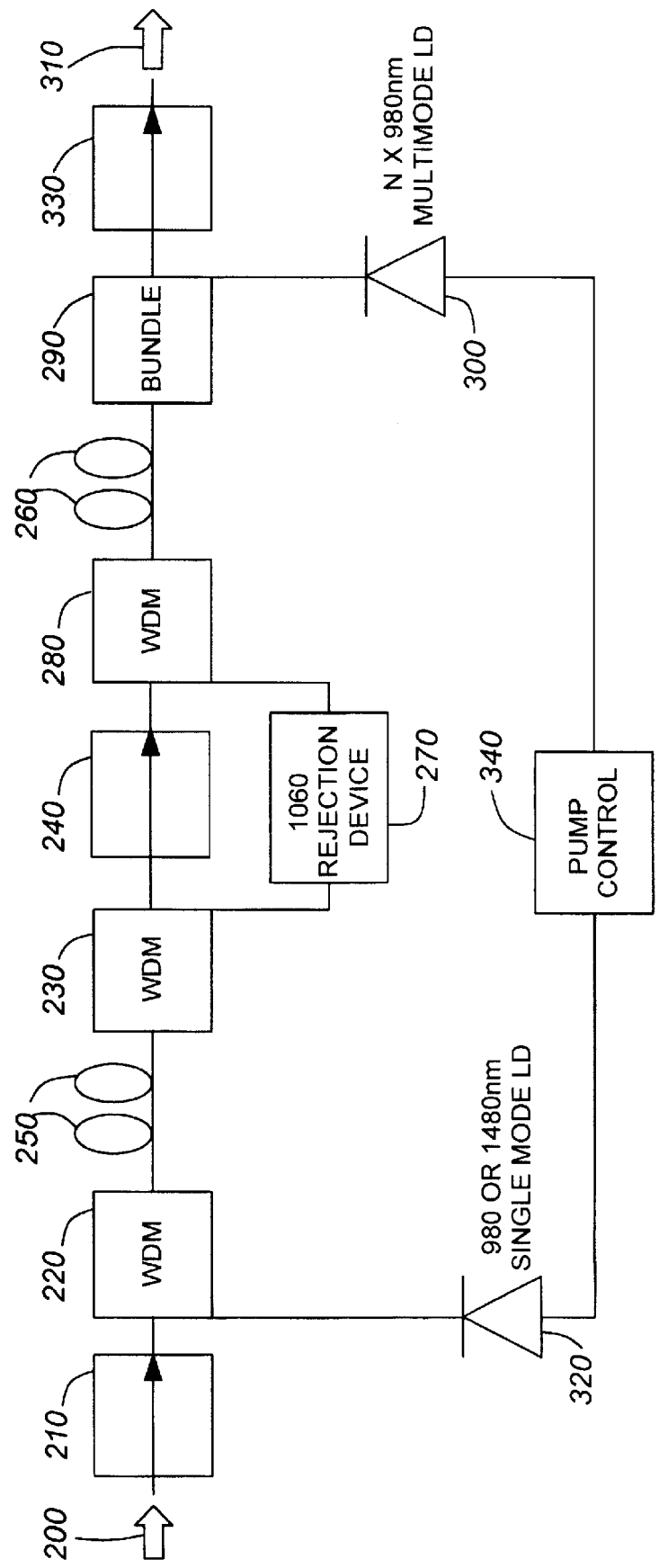
FIG. 2 shows a block diagram showing simultaneous counter-propagation of a single mode laser pumped Er doped single mode fibre and a multi-mode pump light in the cladding area of the Er/Yb double clad fiber while the optical signal is amplified; showing also a bypass path parallel to an isolator which bypasses the residual pump power from the Er stage and let it go into the single mode core of the double clad fiber.

Referring now to FIG. 2, an optical amplifying system is shown having a single mode optical fibre at an input end 200 for launching a communications signal to be pre-amplified and amplified and having a single mode optical fibre at an output end 310 from which the amplified communications signal propagates. A suitable length of single clad Er fibre 250 and of double clad Er/Yb fibre 260 is disposed within the amplifier and is optically coupled to the input and output single mode fibres. Between the double clad fibre and the input end is an isolator 210 followed by a first WDM 220 which passes a 980 nm or 1480 nm pump signal from a single mode pump 320 coupled with the WDM 220 and which passes the communications signal received from the isolator 210. The single clad Er fibre 250 is inserted between the output end of the first WDM 220 and the input end of a second WDM 230. A 1060 nm rejection device in the form of a filter 270 is installed in parallel with an optical isolator 240; both are disposed between the WDM 230 and a third WDM 280. Depending on the type of the WDMs 230 and 280 and the 1060 nm rejection device 270, the rejection device 270 could also be in the place between WDM 280 and Er/Yb fiber 260. The double clad Er/Yb fibre 260 is centrally disposed between the output end of the WDM 280 and a short laser junction in the form of a multimode pump coupler 290, which passes a multi-mode signal from a multi-mode laser pump 300. The amplified communication signal passes through an optical isolator 330 optically coupled to multi-mode pump coupler 290 and the output end 310. A control means in the form of a pump control 340 is coupled to the single mode laser pump 320 and the multi-mode laser pump 300 to provide simultaneous launching from the two pumps. The activation of the pump control 340 depends on detectors (not shown) installed on one end or the other or both ends of the amplifier.

As shown in FIG. 2, the communication signal propagating through the single mode fibre, is pre-amplified in the single clad Er fibre 250 and further amplified in the double clad Er/Yb fibre 260. Between the two steps of amplification, a path in parallel with the optical isolator 240 has been inserted. The WDM 230 separates the residual pump signal from the communication signal which is in 1550 nm band in order not to overload the optical isolator. The 1060 nm rejection device 270 is used to reject back traveling ASE from the Er/Yb double clad fiber, but not to intercept the forward traveling residual single mode pump signal. The WDM 280 is for re-combining the single mode pump signal to the pre-amplified signal. Simultaneously, a 980 nm multi-mode pump signal from the multi-mode laser pump 300 is launched into the inner cladding layer of the double clad optical fibre 260 to counter-propagate with the two previous signals. The energy released from the excitation of Er/Yb is transferred to the communication signal for amplification of same. Unwanted 1060 nm ASE is deviated by the WDM 280 from the optical isolator 240 in order not to damage the isolator.

In conventional single mode optical fibre, it is preferable not to pump bi-directionally into an Er fibre using laser diodes in the same wavelength region because the lasers may interact with each other causing instability and even damage to the lasers. In accordance with the present invention using double clad fibre, the single mode pump light travels in the single core region and the multi-mode pump light is mainly in the clad region. The simultaneous coupling of the pumps renders negligible the interaction between the lasers.

Of course numerous other embodiments may be envisaged without departing from the spirit and scope of the invention.

What I claim is:

1. An optical amplifier for amplifying an input optical signal comprising;
   a wave-guide having a core doped with a rare earth and an adjacent first cladding;
   a first laser pump optically coupled to the core; and,
   a second laser pump optically coupled to the adjacent first cladding;
   wherein the first pump laser is a single mode laser for providing a single mode pump signal to the wave-guide core and wherein the second pump laser is a multi-mode laser for providing a multi-mode pump signal to the adjacent first cladding.

2. An optical amplifier as defined in claim 1 comprising control means for controlling the single mode and multi-mode laser pumps simultaneously.

3. An optical amplifier as defined in claim 2 wherein the control means provides simultaneous engagement of the single mode and the multi-mode laser pumps.

4. An optical amplifier as defined in claim 1, wherein the wave-guide is a double clad optical fibre having a first end and a second end.

5. An optical amplifier as defined in claim 4 comprising a first single clad optical fibre having a core optically coupled to the first end of the double clad optical fibre, and a second single clad optical fibre having a core optically coupled to the second end of the double clad optical fibre.

6. An optical amplifier as defined in claim 5, wherein the cores of the double clad and single clad optical fibres are optically coupled and support single mode light propagation at transmission wavelengths within an amplification band of wavelengths of the amplifier.

7. An optical amplifier as defined in claim 6, wherein the cores of the double clad and single clad optical fibres have a mode field diameter of less than 15 μm.

8. An optical amplifier as defined in claim 6, wherein the double clad optical fibre includes a second cladding adjacent to the first adjacent cladding, and wherein the core of the double clad optical fibre supports single mode light propagation therein and the first adjacent cladding supports multi-mode light propagating therein.

9. An optical amplifier as defined in claim 1, including a rejection filter disposed between the double clad multi-mode fibre and the single mode laser pump, for filtering 1060 nm amplified spontaneous emission for preventing back-traveling of 1060 nm light to the single mode laser pump.

10. An optical amplifier as defined in claim 9, comprising wavelength division multiplexing means optically coupled to the single mode laser pump for multiplexing the single mode signal from the laser pump into the core to combine with the input optical signal.

11. An optical amplifier as defined in claim 10, wherein a portion of the core of the first single clad optical fibre is doped with a rare earth for pre-amplifying the input optical signal traveling towards the core of the double clad optical fibre.

12. An optical amplifier as defined in claim 11, comprising an optical isolator centrally disposed between the first single clad optical fibre and the double clad optical fibre for isolating the pre-amplified input signal propagating in the direction from the single clad optical fibre to the double clad optical fibre and for preventing counter propagation of a signal in the other direction.

13. An optical amplifier as defined in claim 12 comprising a bypass path in parallel to the optical isolator for allowing the single mode laser pump signal to bypass the optical isolator for preventing damage thereto, and for allowing light having a wavelength substantially about 1060 nm to travel in the counter direction.

14. An optical amplifier as defined in claim 13 wherein the bypass path comprises a rejection filter for preventing back-travelling 1060 nm light to the single mode laser pump.

15. An optical amplifier as defined in claim 14 comprising two wavelength division multiplexers at ends of the optical isolator for filtering light having a wavelength of substantially about 1060 nm and 980 nm for protecting the optical isolator and the single mode laser pump.

* * * * *

UNITED STATES PATENT AND TRADEMARK OFFICE
CERTIFICATE OF CORRECTION

PATENT NO.    : 6,487,006 B1
DATED         : November 26, 2002
INVENTOR(S)   : Chen It is certified that error appears in the above-identified patent and that said Letters Patent is hereby corrected as shown below:

<u>Title page,</u>
Item [75], the inventor's name "Vihong Chen" should read -- Yihong Chen --

Signed and Sealed this

Fifteenth Day of April, 2003

JAMES E. ROGAN
*Director of the United States Patent and Trademark Office*